United States Patent
Wieduwilt et al.

(10) Patent No.: US 9,993,970 B2
(45) Date of Patent: Jun. 12, 2018

(54) CROSS SEAM JOINING DEVICE FOR JOINING A SEALING SEAM FOR A FLEXIBLE PACKAGING

(71) Applicant: Robert Bosch GmbH, Stuttgart (DE)

(72) Inventors: Ulrich Wieduwilt, Schwaebisch Gmuend (DE); Lukas Oehm, Dresden (DE); Marko Liebler, Bretten (DE); Sascha Bach, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 14/901,233

(22) PCT Filed: Mar. 6, 2014

(86) PCT No.: PCT/EP2014/054336
§ 371 (c)(1),
(2) Date: Dec. 28, 2015

(87) PCT Pub. No.: WO2014/206580
PCT Pub. Date: Dec. 31, 2014

(65) Prior Publication Data
US 2016/0368205 A1    Dec. 22, 2016

(30) Foreign Application Priority Data
Jun. 28, 2013    (DE) .................. 10 2013 212 715

(51) Int. Cl.
*B32B 37/00*    (2006.01)
*B29C 65/00*    (2006.01)
(Continued)

(52) U.S. Cl.
CPC ............ *B29C 66/8491* (2013.01); *B06B 3/00* (2013.01); *B29C 65/087* (2013.01);
(Continued)

(58) Field of Classification Search
CPC ..... B29C 65/08; B29C 65/087; B29C 65/745; B29C 65/7451; B29C 66/1122;
(Continued)

(56) References Cited

U.S. PATENT DOCUMENTS 3,518,136 A    6/1970   Mori et al.
4,071,385 A *  1/1978   Kuris ..................... B44C 1/26
                                                          156/154
(Continued)

FOREIGN PATENT DOCUMENTS

DE    1704204       3/1972
DE    102008044370  6/2010
(Continued)

OTHER PUBLICATIONS

International Search Report for Application No. PCT/EP2014/054336 dated Jun. 3, 2014 (English Translation, 2 pages).

*Primary Examiner* — James Sells
(74) *Attorney, Agent, or Firm* — Michael Best & Friedrich LLP

(57) ABSTRACT

The invention relates to a cross seam joining device for a flexible packaging having at least one ultrasonic applicator (13a-13c), which is rotatably mounted on a shaft (13d) and can be rotated about an axis (13e) of the shaft (13d) arranged longitudinally to the cross seam (110, 111). The ultrasonic applicator (13a-13c) is designed to produce and bundle ultrasounds in a frequency range of 0.1 MHz-0.5 MHz, preferably from 0.5 MHz-2 MHz.

7 Claims, 4 Drawing Sheets

(51) Int. Cl.
  *B29C 65/08* (2006.01)
  *B29C 65/74* (2006.01)
  *B06B 3/00* (2006.01)
  *B65B 51/22* (2006.01)
  *B65B 51/30* (2006.01)

(52) U.S. Cl.
  CPC ........ *B29C 65/745* (2013.01); *B29C 65/7451* (2013.01); *B29C 66/0326* (2013.01); *B29C 66/1122* (2013.01); *B29C 66/4312* (2013.01); *B29C 66/43121* (2013.01); *B29C 66/73921* (2013.01); *B29C 66/81417* (2013.01); *B29C 66/81419* (2013.01); *B29C 66/81427* (2013.01); *B29C 66/81465* (2013.01); *B29C 66/83513* (2013.01); *B29C 66/849* (2013.01); *B29C 66/9513* (2013.01); *B29C 66/9517* (2013.01); *B65B 51/225* (2013.01); *B65B 51/306* (2013.01); *B29C 65/08* (2013.01); *B29C 66/133* (2013.01); *B29C 66/4322* (2013.01); *B29C 66/8122* (2013.01); *B29C 66/81421* (2013.01)

(58) Field of Classification Search
  CPC . B29C 66/4312; B29C 66/43121; B06B 1/06; B06B 1/0207; B06B 3/00; B65B 51/225; B65B 51/26; B65B 51/306
  USPC ........ 156/73.1, 73.3, 515, 530, 580.1, 580.2
  See application file for complete search history.

(56) References Cited

U.S. PATENT DOCUMENTS

2002/0166617 A1* 11/2002 Molander ......... A61F 13/15585
                                                        156/73.1
2002/0189206 A1   12/2002 Capodieci

FOREIGN PATENT DOCUMENTS

DE   102009002093   10/2010
DE   102009026952   12/2010

\* cited by examiner

CROSS SEAM JOINING DEVICE FOR JOINING A SEALING SEAM FOR A FLEXIBLE PACKAGING

BACKGROUND OF THE INVENTION

The present invention relates to a device for joining a cross seam of a flexible packaging and particularly to a device for joining a cross seam of a tubular bag packaging by means of an ultrasonic applicator.

Devices are already known, in which join connections on packagings are produced on horizontal and vertical tubular bag machines by means of conventional ultrasound in the range of 20 to 40 kHz.

After shaping the packaging material on the forming shoulder, the film is joined to form a packaging material tube by means of the longitudinal seam. After the product has been fed into the tubular bags, the cross seams are sealed; the product feed can, however, also take place when the tube is being formed. The packaging material tube is subsequently separated into individual tubular bags by means of a cutting function.

In the known devices, conventional ultrasonic systems consist of a converter, an optional booster and a sonotrode. The vibration generated in the converter by means of the inverse piezoelectric effect is intensified in the booster and directed into the packaging material via the sonotrode. A standing wave forms in the resonantly vibrating overall system. The tools, in particular the sonotrode, must thereby be designed as $\lambda/2$ oscillators and are therefore subject to geometrical restrictions. These functional limitations mean that the application on the tubular bag machine has to be oriented to the operating principle of the sonotrode and not to the dimensions of the packaging. The production of the sonotrodes has proven to be complicated and expensive. This is also a reason why this expensive technology is used in the market only for special applications.

The heat generation in the packaging material is based on inner friction and boundary surface friction. In order to fuse the packaging material, a sealing force >200 N is therefore necessary between sonotrode and packaging material.

The induction of sound into the joining zone generally occurs perpendicularly to the joining surface. A precondition for the heat generation is the use of an energy director as a counterpart to the sonotrode.

Due to the standing wave in the oscillation system, fastening options for the sonotrode are only possible at the nodal points of vibration, where said sonotrode has a zone of the smallest expansion. In this so-called zero line, vibrations should hardly be present. A connection of the sonotrode to corresponding machine elements outside of nodal points of vibration generally leads to a severance and destruction of the coupling point.

According to the patent publication DT 1704204 A, a method for joining plastic parts based on focused ultrasound is furthermore known. The ultrasonic waves with a frequency of over 100 kHz generated by a vibrator are bundled by means of the vibrator geometry or a focusing assembly and transmitted through a liquid medium. The sound waves directed through the liquid medium excite a membrane into vibration which is pressed onto the plastic parts to be welded.

In addition, the German patent publication DE 10 2008 044 370 A1 describes a device and a method for connecting components by means of focused ultrasound. In this case, the wave guide is formed either by a conical element produced from a metallic solid material or from a liquid- or gel-filled membrane.

SUMMARY OF THE INVENTION

The present invention therefore relates to a cross seam joining device for joining a sealing seam for a flexible packaging, said cross seam joining device comprising at least one ultrasonic applicator, which is mounted on a shaft and can be rotated about an axis of the shaft arranged along the cross seam, wherein the ultrasonic applicator is designed to produce and bundle ultrasounds in a frequency range of 0.1 MHz to 5 MHz, preferably from 0.5 MHz to 2 MHz. A frequency range of 0.1 MHz to 5 MHz, preferably 0.5 to 2 MHz, is used for a flexible packaging with the cross seam joining device according to the invention. A progressive and focused wave field forms in the sound conductor. A significant advantage is that the sound conductor does not have to be resonantly designed. There are practically no restrictions with regard to the design thereof as is known from conventional ultrasound. That means that the effective area of the ultrasonic application can be optimally adapted to the geometry to be joined, in this case to the sealing seam. A focusing of the sound waves is achieved by means of the focusing assemblies according to the invention (lens, geometry of the ultrasonic transducer). The sound conductor is significantly more compact in comparison to the geometrical expansion of the conventional sonotrode and is not set into resonance vibrations. This feature makes it possible to create smaller assemblies and significantly reduces the manufacturing effort and costs. According to the invention, the sound transducer can be fixed at any arbitrary location. The fixation of said sound transducer can occur in close proximity to the joining location. As a result, this variant described is significantly more rigid than is possible with a fixation at the nodal point of vibration. The amplitude of the sound conductor tip (sealing surface) is maximally only a few micrometers, which leads to a significantly smaller packaging material load in comparison to the large amplitudes of the conventional ultrasound (12-40 µm). The amplitude distribution can fluctuate considerably with the conventional sonotrodes. This disadvantage cannot be detected at the sound conductor tip of the ultrasonic applicator according to the invention. Provision is advantageously made according to the invention for the ultrasonic waves to be introduced in a focused manner into the region of the sealing seam. An energy director in the form of a vibration-resistant anvil is not necessary as is the case for conventional ultrasound. In order to introduce sound into the packaging material and thus bring about the fusion thereof, only the contact of sound conductor to packaging material is required. An increased contact pressure is not required as in conventional ultrasound technology. According to the invention, the sound does not have to be induced perpendicularly into the joining zone (as is the case with conventional ultrasound) but can be induced into said zone in any direction. Although the operating frequency of the conventional ultrasound lies above the frequency range which can be perceived by humans, the noise emissions are problematic due to the vibrational response of the overall structure or the stimulation of subharmonics and can lead to irreparable damage to hearing if ear protection is not used. The device according to the invention is practically noiseless in comparison to conventional ultrasonic methods. This is due to the fact that a vibrational response does not occur in the audible frequency range, and the high frequencies in the air as well as in the machine components can be very quickly damped and cannot spread over greater distances. Conventional ultrasonic systems reverberate approximately 350 ms after switching off the energy supply. This represents a potential danger spot for the user because an immediate stoppage of the vibrating system does not occur, even in the case of an emergency shutdown. If, on the contrary, the generator of the device according to the invention is switched off, the release of energy in the form of sound waves or mechanical vibrations is stopped immediately and without delay.

Provision is made in a preferred modification to the invention for the ultrasonic applicator to comprise an ultrasonic transducer for vibration generation, a focusing assembly and a sound conductor. As a result, it is possible to design and dimension the ultrasonic applicator corresponding to the respective design requirements. The ultrasonic energy is precisely introduced into the joining area by means of the focusing assembly and the sound conductor.

Provision is furthermore made according to the invention for the ultrasonic applicator to be mounted on a carrier connected to the shaft. As a result, a plurality of ultrasonic applicators can be disposed on a rotatable carrier in order to thus generate effectively precise joining seams. In so doing, the shaft can be mounted at any position in a rotary embodiment of the device according to the invention because no transversal or longitudinal vibrations, such as those known from conventional rotary vibrating systems, are transmitted to the shaft. In the case of known rotary ultrasonic sonotrodes, which operate in the range of 20 to 40 kHz, the complete vibrating system, i.e. sealing lugs and shaft, is matched to the excitation frequency. This embodiment requires an extremely high manufacturing effort and manufacturing time because the resonance frequency has to be checked time and again in certain manufacturing steps until final completion. This very complex manufacturing process is extremely cost intensive. In the example described of an inventive rotary ultrasonic applicator comprising four sealing lugs, the function of the sound generating assemblies is not affected by the shaft body. As a result, the sealing surface can be optimally adapted to the product independently of the shaft length.

A counter holder, which is mounted so as to be rotatable about an axis and which is furnished with at least one blade, is provided in a particularly favorable manner, wherein the axis is disposed parallel to the axis of the shaft. It is possible by means of the counter holder to support the joining seam. The blade is used to separate the individual film bags.

It is particularly favorable if the blade is integrated into the counter holder. This allows for a compact design of the device and ensures a reliable separation process.

It is particularly favorable if the blade is disposed adjacent to the counter holder. This particularly contributes to the entire device being designed in a maintenance friendly manner because the blade can easily be replaced.

Provision is furthermore made in a preferred embodiment of the invention for respectively one ultrasonic applicator to be provided on each side of the cross seam in order to form a head seam and a foot seam-cross seam. The head seams and foot seams of the cross seam can thus be generated in each case by means of a separate ultrasonic applicator.

According to the invention, the ultrasonic transducer is preferably designed in the shape of a plate. This simplifies the production and leads to a reduction in costs and furthermore ensures a reliable function.

In order to focus the ultrasonic waves, provision is preferably made for the focusing assembly to be designed lenticularly.

It is furthermore advantageous if the counter holder is made from a ceramic material. As a result, favorable frictional characteristics are provided. In addition, the ceramic material is resistant to wear.

BRIEF DESCRIPTION OF THE DRAWINGS

Exemplary embodiments of the invention are described below in detail with reference to the accompanying drawings. In the drawings.

DETAILED DESCRIPTION

According to the invention, the joining of flexible, thermoplastic packing materials takes place on horizontal and vertical tubular bag machines (HFFS machines and VFFS machines) by means of ultrasound in the range of 0.1 MHz to 5 MHz, preferably from 0.5 MHz to 2 MHz. In order for the vibrations to have an effect on the packaging material using conventional ultrasound, a correspondingly large counter force is necessary so that the sonotrode does not lift off and can mechanically have an effect on the packaging material. In addition, the anvil requires an energy director in order to accelerate the fusing of the thermoplastic layers.

Figure 1:
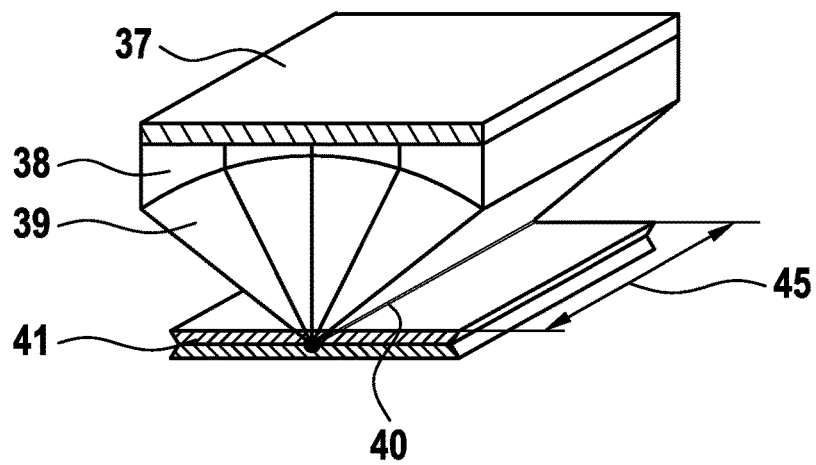
FIG. 1 shows a schematic depiction of the functionality of the ultrasonic applicator according to the invention.

The joining device according to the invention generates an amplitude of, e.g., only 1-2 μm at the sound conductor by means of an ultrasonic applicator at a frequency of, e.g., 1 MHz. This very small amplitude does not produce any packaging material load and thus any damage to the packaging material during the joining process. The energy input (FIG. 1) into the packaging material to be joined occurs by means of a heat build-up 40 in the focus region of the ultrasonic applicator, practically directly in the joining zone and not by means of hammering movements of the sonotrode in the direction of the packaging material 41, which is the case in the prior art.

Figure 2:
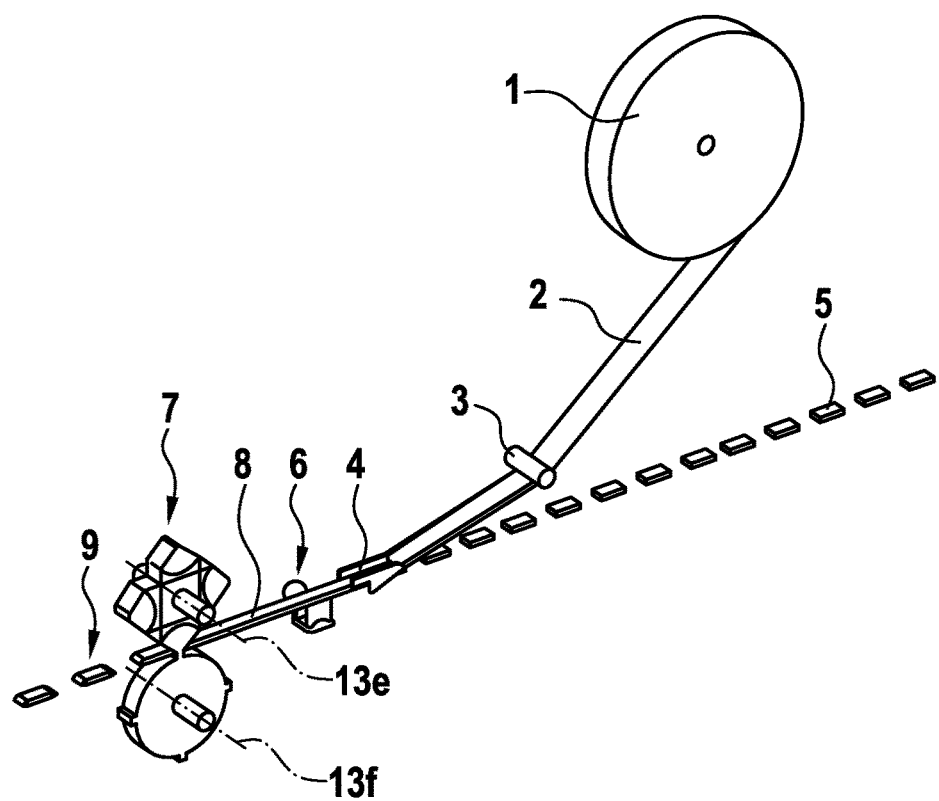
FIG. 2 shows a schematic depiction of the functionality and application of the method according to the invention.

The functionality and application of the inventive joining device for the longitudinal and cross seam on an HFFS machine is depicted in FIG. 2. A packaging material web 2 is led from a packaging material roll 1 via a guide roller 3 and via a forming shoe 4 to a packaging material tube 8. A fin or an overlap seam is subsequently joined by means of a longitudinal sealing device 6. After having been delivered from the product chain to the packaging material tube 8, the products 8 are further transported by means of friction between product and packaging material to the transverse sealing point 7 comprising a separating function. The transverse sealing device 7 joins the two transverse sealing seams of the tubular bag and carries out the separating function 9 by means of cutting between the sealing operations.

The ultrasonic applicator can be secured directly at the joining location; however, any other attachment options at the sound conductor are also possible.

An anvil comprising an energy director is not required to form the joining seam because the fusing of the sealing layers at the connection point takes place primarily in the region of the linear focus region.

Figure 3:
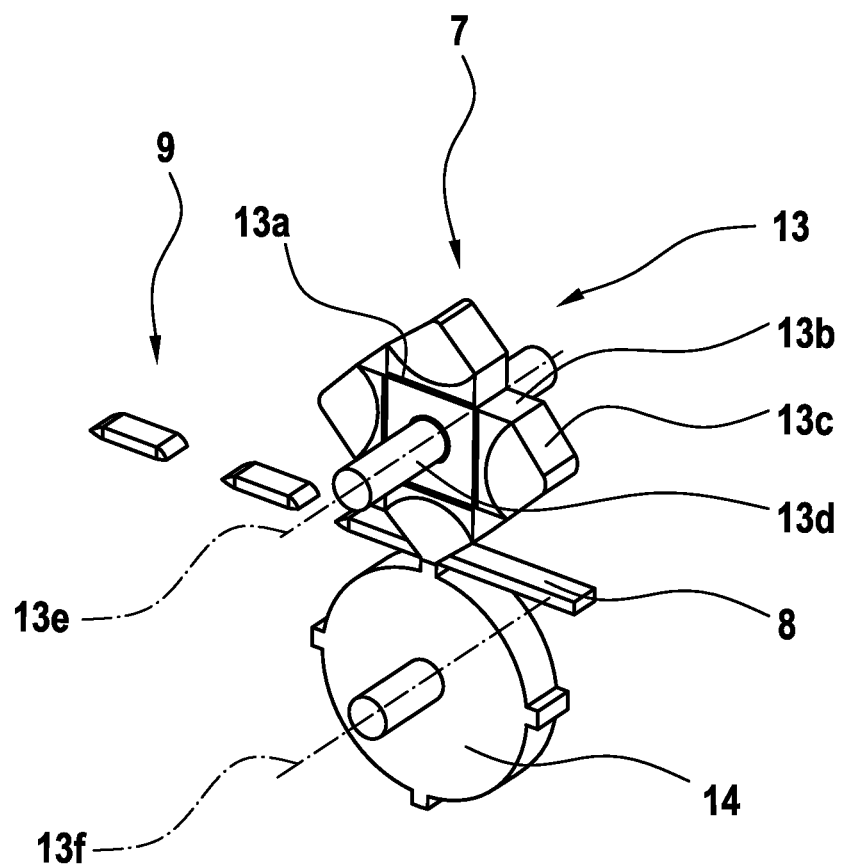
FIG. 3 shows a simplified perspective, detailed view of the ultrasonic applicator according to the invention in quadruple arrangement on a carrier with an associated counter holder unit.

The sealing device for the cross seams is depicted in detail in FIG. 3. A highly precise adjustment of the sealing gap, as is known from conventional ultrasound, is not necessary in this method because only a coupling of the sound conductor to the packaging material must be provided. The adjustment procedure is equally simple as that of the heat sealing technique.

Four sealing lugs in the form of wedge-shaped sound conductors 22 are provided on a base shaft 13d which can be rotated about an axis 13e in the embodiment variant of the inventive transverse sealing device 7 shown here. The embodiment variants can vary from one to eight sealing lugs and can also have an odd number of sound conductors in contrast to the rotary ultrasonic sonotrode according to the prior art. A fixation 13 of the focusing assembly 13b to the shaft 13d and to the sound conductor 13c can be a frictional or a positive-locking type of connection. The vibrations in the range of 0.1 MHz to 5 MHz, preferably in the range of 0.5 MHz to 2 MHz, are converted from an ultrasonic transducer 13a, for example a piezoceramic, via a focusing assembly 13b employing a sound conductor 13c into a heat line. This heat line generates the temperature input into the joining materials necessary for the sealing process. With the aid of a mating gear 14 that can be rotated about an axis 13f (rotary counter-holder device), the joining pressure necessary for the joining process is produced and the corresponding crushing or cutting force for the separating process is generated at the same time.

A packaging material tube comprising product 8 is fed to the applicator/counter-holder unit 14 which rotates synchronously about an axis 13f. The head seam of the leading tubular bag 9 is first formed. The separating function occurs thereafter, and the foot seam of the trailing tubular bag (9) is formed when the sealing lugs are rolled further.

A significant advantage of this embodiment is the low vibration load on the drive shaft 13d. As a result, the shaft can be mounted directly in the bearing shields (not shown). A decoupling of the vibrations by means of sleeves, which are secured in the nodal points of vibration, is not necessary. The shaft can be mounted at any desired position thereon.

Figure 4:
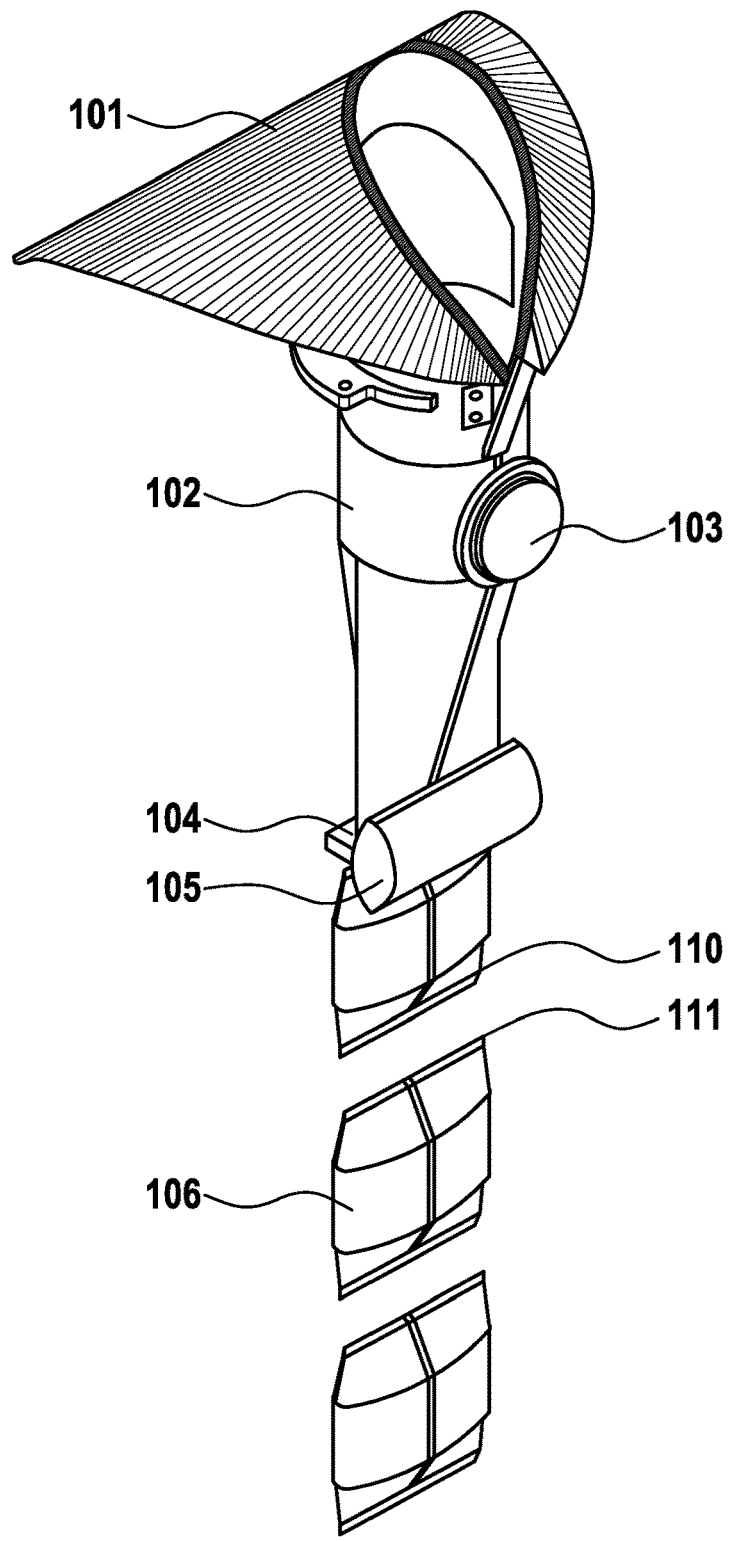
FIG. 4 shows a schematic depiction of the design of a vertical cross seam device according to the invention.

In the case of VFFS machines, as shown in FIG. 4, a packaging material web is likewise formed to a film tube 102 by means of a forming shoulder 101. A downstream longitudinal sealing device 103 according to the invention joins an overlap seal or a fin seal.

A sound conductor 103, which is responsible for the heat input, is located directly beneath the forming shoulder 101, where the film is formed to a tube 102. This very simple design can be implemented on every tubular bag machine, regardless of whether an intermittent or continuous operating principle is employed. An element for the distribution of the sealing melted mass can be provided on the counter holder 104 for an optimal sealing seam formation, i.e. with high levels of sealing seam strength.

A laminar distribution of the liquid sealing medium in the sealing zone is achieved with this device. The partially liquefied sealing layer is not pushed aside by hammering movements, which are caused as a result of the method employing conventional ultrasound, but rather stays in the sealing zone until hardening and therefore significantly increases the strength of the sealing seam.

As a result of gravity, the products are fed into the preformed packaging material tube, which is sealed with a cross seam/foot seam 110/111 by means of the transverse sealing tools 104, 105 of the inventive sealing unit. After the filling process, the tubular bag 106 is sealed on top with a cross seam/head seam 110/111 and subsequently separated into individual packagings.

Figure 5:
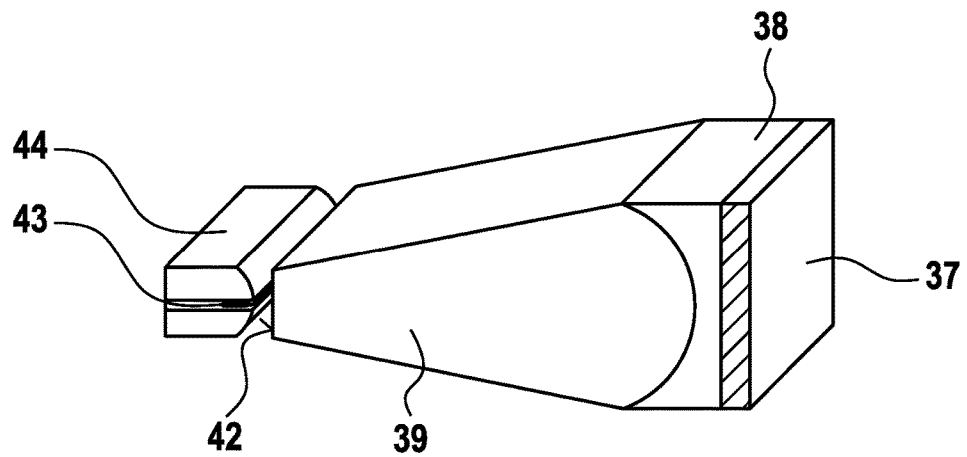
FIG. 5 shows a schematic, perspective view of an inventive ultrasonic applicator comprising a counter holder and a blade.

The sealing device according to the invention depicted in FIG. 5 consists of an ultrasonic transducer 37 comprising a focusing assembly 38 and a sound conductor 39. When configuring the sealing seam length 45 (see FIG. 1), a working surface 42 is independent of the wave length of the system frequency as is the case for conventional ultrasound, and any format range can thus be processed.

The counter holder 44 is provided with a blade for the cutting function, by means of which the tubular bags can be separated.

The sealing device according to the invention can be designed very compactly because neither a converter nor a booster is required for the operation thereof.

The mass reduction in combination with the compact design has a positive effect on the dynamics of the cross-seal housing of the tubular bag machine, said cross-seal housing working with a box-motion movement. In this way, the output of the tubular bag machine can be increased.

Figure 6:
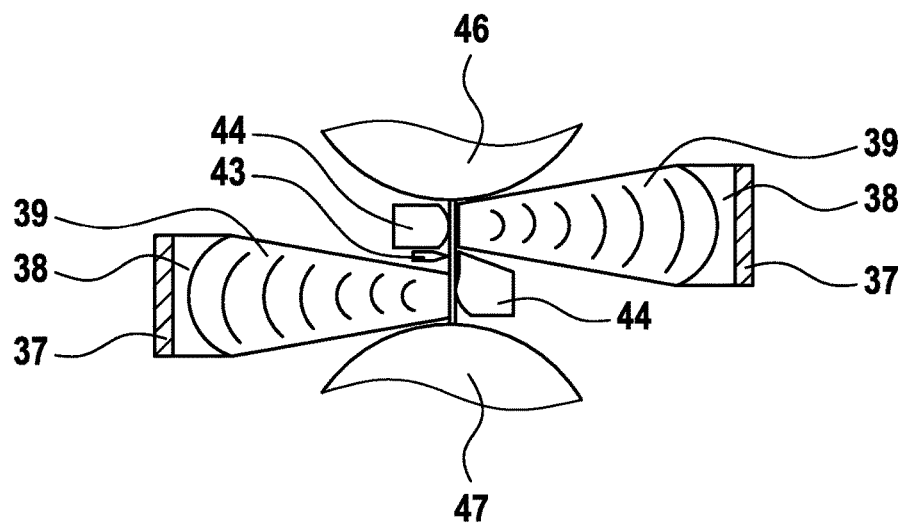
FIG. 6 shows a schematic depiction of two ultrasonic applicators and two counter holders as well as a blade in a further exemplary embodiment of the invention.

Further embodiments are depicted in FIG. 6. An inventive sealing system is provided here for each of the two cross seams 110, 111 according to FIG. 4 on the tubular bag 106. As a result, the sealing of the foot seam 111 of the upper tubular bag 47 and the head seam 110 of the lower tubular bag 47 can take place simultaneously or in a temporally offset manner. In FIG. 6, the reference sign 46 denotes an upper packaging, whereas the reference sign 47 denotes a lower packaging. The cutting blade 43 is disposed separately from the counter holders 44. The ultrasonic applicator is designed analogous to the exemplary embodiment of FIG. 5 and comprises an ultrasonic transducer 37, a focusing assembly 38 and a sound conductor 39. The propagating waves are depicted in a simplified manner in the sound conductor 39.

What is claimed is:

1. A cross seam joining device for a flexible packaging, the device comprising at least one ultrasonic applicator (13a-13c), which is mounted on a shaft (13d) and is configured be rotated about an axis (13e) of the shaft (13d) arranged longitudinally to the cross seam (110, 111), characterized in that the ultrasonic applicator (13a-13c) is configured to produce and bundle ultrasounds in a frequency range of 0.1 MHz to 5 MHz, wherein the ultrasonic applicator (13a-13c) comprises an ultrasonic transducer (37), a focusing assembly (38) and a sound conductor (39), wherein the ultrasonic transducer (37) is plate-shaped and the focusing assembly (38) is lenticular, and the device further includes a ceramic counter holder (14).

2. The device according to claim 1, characterized in that the ultrasonic applicator is mounted adjacent to the ultrasonic transducer (13a) on a carrier (13) connected by means of the shaft (13d).

3. The device according to claim 1, wherein the counter holder (14) is rotatably mounted about an axis (13f), which is disposed parallel to the axis (13e) of the shaft (13d), and is provided with at least one blade (43).

4. The device according to claim 3, characterized in that the blade (43) is integrated on the counter holder (14).

5. The device according to claim 3, characterized in that the blade (43) is disposed adjacent to the counter holder (14).

6. The device according to claim 1, characterized in that respectively one ultrasonic applicator is disposed on both sides of the cross seam in order to form a head seam-cross seam (110) and a foot seam-cross seam (111).

7. The device according to claim 1, characterized in that the ultrasonic applicator (13a-13c) is configured to produce and bundle ultrasounds in a frequency range from 0.5 MHz to 2 MHz.

* * * * *